United States Patent Office 3,468,775
Patented Sept. 23, 1969

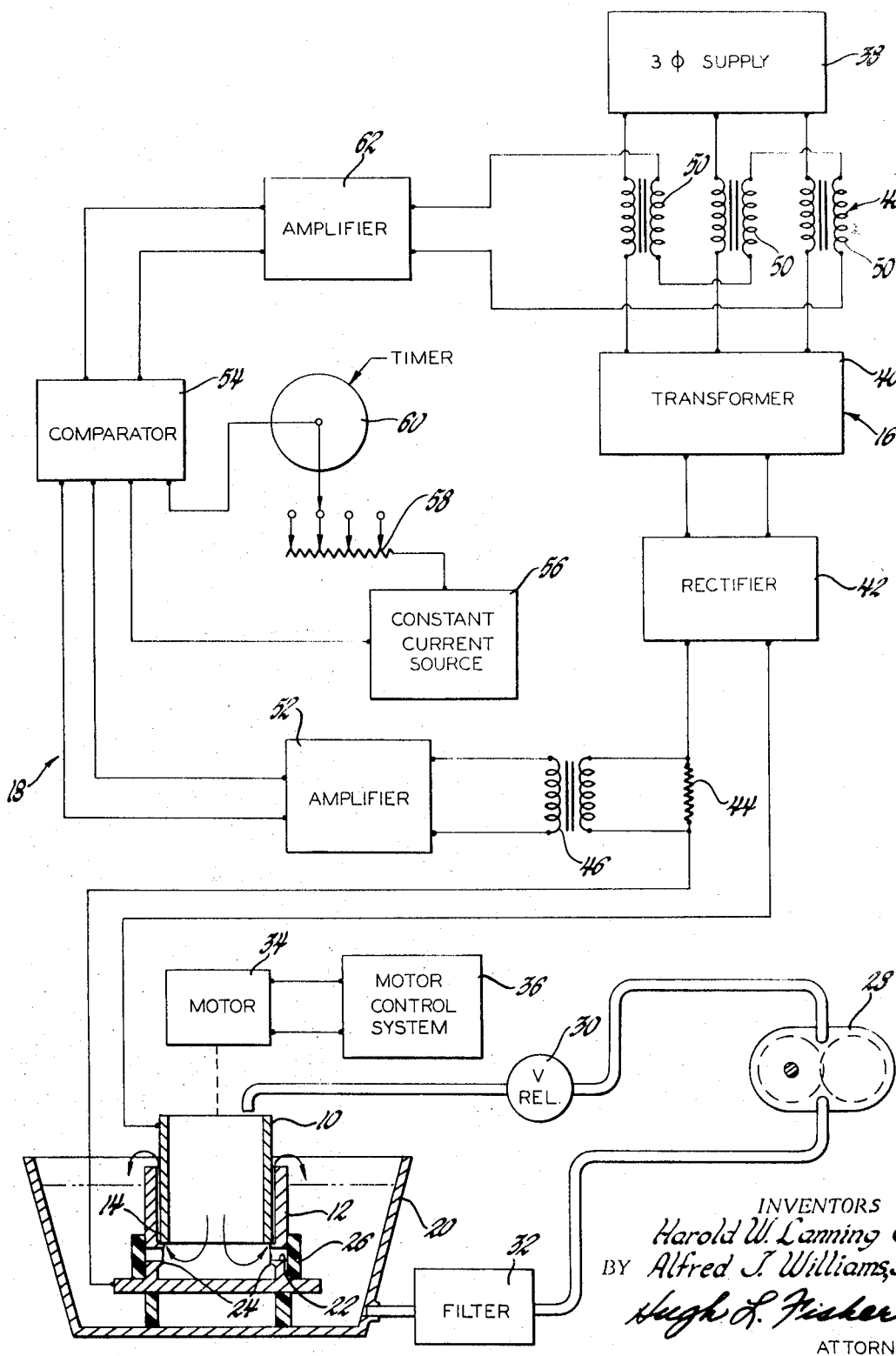

3,468,775
ELECTROLYTIC STOCK REMOVAL AND DEBURRING METHOD
Harold W. Lanning, Inkster, and Alfred J. Williams, Jr., Berkley, Mich., assignors to General Motors Corporation, Detroit, Mich., a corporation of Delaware
Filed Sept. 29, 1964, Ser. No. 400,040
Int. Cl. B23p 1/00
U.S. Cl. 204—143　　　　　　　　　　　　　2 Claims

ABSTRACT OF THE DISCLOSURE

Electrochemical machining method for providing a machining gap with current in controlled stages. The power supply method incorporates a control system that initially causes the current to the gap to be progressively increased for a time adequate to burn away short circuit producing burrs on the workpiece. Next, the control system reduces the current to permit the workpiece to cool and then the control system increases the current to the level required to electrochemically machine the workpiece to a desired size.

---

This invention relates to an improved method for electrically removing stock from a conductive workpiece.

Perhaps because of the inherent nature of any electrical stock removal process, the possible occurrence of unwanted short circuits always exists. These short circuits can not only damage either or both the cutting tool and the workpiece, but also slow the process or even in extreme cases actually stop all machining. An instance where the short circuits can be a problem, occurs when using the process known as electrochemical machining to deburr workpieces. Very often these workpieces have been drilled leaving not only large burrs but also chips. If the deburring tool physically contacts these large burrs and chips, a direct short will result and the process will be stopped. The deburring tool then must be withdrawn and the large burrs and chips producing the short circuit condition removed. Obviously, this is time consuming and precludes volume production.

To overcome this problem, a novel electrical stock removal method is including the steps of supplying power to the machining gap in controlled stages. Somewhat more specifically stated, the novel method supplies the power to the machining gap in different amounts and according to a certain timed sequence.

Specifically, the invention contemplates novel electrical stock removal method wherein machining current is supplied to the gap initially in progressively increasing amounts, each for predetermined time intervals so as to heat the workpiece and burn away large burrs and chips; then reducing the machining current to an amount that will permit the workpiece to cool; and finally supplying machining current in an increased amount adequate to promote electrical stock removal from the workpiece.

The foregoing and other objects and advantages of the invention will become apparent from the following description and from the accompanying drawing in which electrical stock removal method incorporating the principles of the invention is illustrated schematically.

Considering now the details of the drawing, the numerals 10 and 12 denote generally electrodes, which will hereinafter be referred to respectively as the cutting or deburring tool and the workpiece. Since in this preferred embodiment the electrochemical machining process is involved, a suitable electrolyte is flowed between the machining gap established between the deburring tool 10 and the workpiece 12 and shown generally at 14. The electrical energy is supplied to the gap by a power supply designated generally at 16.

With the workpiece 12 performing as the anode and the deburring tool 10 as the cathode a circuit is completed therebetween by the electrolyte so that a low voltage, high direct current power furnished by the power supply 16 will in effect cause metal to be dissolved from the surface of the workpiece 12. The removal rate, as is well known, is determined in accordance with Faraday's Law and, hence, is directly proportional to the number of amperes of current furnished by the power supply 16. As will become more apparent, the amount of this current is regulated by the current control system viewed generally at 18.

For exemplary purposes the workpiece 12 is shown having a cup-shaped configuration and is mounted within and insulated from an electrolyte tank 20. The workpiece 12 has a through-hole 22 with large burrs illustrated at 24. It is these burrs 24 that are to be removed by the method.

The deburring tool 10 is preferably hollow so that the electrolyte can be transferred therethrough in the direction of the arrows. A suitable seal 26 prevents the electrolyte from escaping via the through-hole 22. This electrolyte is supplied to the deburring tool 10 by a pump 28 at a pressure determined by a conventional pressure regulator valve 30. The magnitude of this pressure will, of course, have to be varied according to the particular application of the process. By having the inlet of the pump 28 connected to the tank 20 a continuous circulation of the electrolyte can be maintained and contaminants can be removed by a filter 32.

Although it is possible to move either or both the deburring tool 10 and the workpiece 12 relative to each other, in this embodiment the deburring tool 10 is preferably fed into the workpiece 12 by a motor 34 at a relatively fixed rate. The motor can be of any known construction, either electrically operated or hydraulically operated by an appropriate motor control system 36; e.g., as disclosed in Wanttaja et al. 3,228,863. Both the motor 34 and the motor control system 36 can be varied considerably in character, as will be understood by those versed in the art, in order to achieve the desired machining rates for a particular application of the process.

The power supply 16, as has been mentioned, furnishes the low voltage, high direct current power to the gap 14. This power can be derived in different ways as will be appreciated. One way is to transfer AC power from a conventional three-phase supply 38 successively through an appropriate step-down transformer 40 and a rectifier 42. This provides the required high direct current at a low voltage; by way of example only, 1000 amperes at 5–20 volts.

With the mentioned workpiece configuration the burrs 24 can be quite large and also there can be other debris in this vicinity such as chips. When the deburring tool 10 moves into the workpiece 12, the edge of the deburring tool 10 will actually physically contact these large burrs and chips. Consequently, a direct short circuit is established across the gap 14. The short circuit will shunt the current that should be passing through the electrolyte and the process will stop, or at least be substantially impeded.

To overcome this problem the current control system 18, for a reason which will become more apparent, is employed for altering the number of amperes of current supplied to the electrolytic circuit extending through the gap 14.

The control system 18 achieves this current control by sensing the current at the output of the rectifier 42 by means of a shunt resistor 44 and a transformer 46. The varying of the current is done by using a transductor or, in this instance, a saturable core reactor designated generally by the numeral 48 and arranged between the three-phase supply 38 and the transformer 40. The reactor 48 is of well known construction and includes control windings 50. When the direct current supplied to these control windings 50 is altered the degree of saturation of the reactor's cores is changed. This in turn changes the reactance to the flow of the alternating current from the three-phase supply 38. In this manner the amount of the alternating current supplied to the transformer 40 is adjusted.

Considering the details of the control system 18 for generating the control or error signal supplied to the control windings 50, the transformer 46 and the shunt resistor 44 together produce a voltage that reflects changes in the direct current to be supplied to the gap 14. This supply voltage may be increased by an amplifier 52 and then transferred to a suitable comparator 54. The comparator 54 is used to compare this supply voltage from the amplifier 52 with a reference voltage that reflects the desired current.

The desired current is obtained from a constant current source shown at 56 and a variable resistor 58 connected to the output of the source 56. The amount of resistance presented by the variable resistor 58 to the constant current flow from the source 56 is altered by an appropriate programmed timer 60, such as the Multiflex Reset Timer. Consequently, the number of amperes of current to be supplied to the comparator 54 is determined by the program of the timer 60. The voltage of this current, of course, will reflect the current changes and therefore serves as a reference voltage, which can be compared with the supply voltage derived from the amplifier 52. The comparator 54 will develop therefrom an error signal voltage representing the algebraic sum of the reference and supply voltages. Another amplifier 62 can, if needed, be used to increase the error signal before it is applied to the control windings 50. The resultant direct current flow in the control windings 50 will produce a corresponding core saturation as previously discussed.

In operation it is preferred that an initial heating cycle take place so as to burn away the chips and the large burrs. Next, the workpiece is allowed to cool in the area of these burrs 24 for a certain time, after which the conventional electrochemical machining process is commenced so as to remove the remainder of the burrs 24 from the inside of the workpiece 12.

Accordingly, the program for the timer 60 is arranged for a predetermined timed sequence by way of example only so that the current supplied to the gap will, during the heating cycle, be increased in separate timed stages successively from 60 amperes to 120 amperes and finally to 280 amperes. Of course, the time that the direct current is maintained at each of these amperage values will be determined by the application of the process and the type of burrs being removed. To allow the cooling, the direct current is reduced to 120 amperes for whatever time interval is required, and then the conventional electrochemical machining action is initiated at the 280 ampere level.

With the corresponding reference voltages being applied to the comparator 54 the error signal will vary accordingly and, therefore, the direct current supplied to the control windings 50 will reflect these variations in the error signal and cause the saturation of the reactor's cores to change the required amounts. Consequently, when the error signal is maximum the corresponding maximum current through the control windings 50 will be maximum and cause the reactor's cores to approach saturation. The reactance will be small and, therefore, the output alternating current will be at its maximum value; e.g., that required to provide 280 amperes. The 60 ampere output will occur when the error signal causes the direct current to the control windings 50 to be minimum so that the saturation of the reactor's cores will likewise be reduced and present a greater reactance to current flow.

Operationally then, the timer 60 will alter the resistance afforded by the variable resistor 58 so as to provide control winding currents that will in turn vary the reactances to the alternating current flow through the reactor 48 such that the supply current is successively maintained at 60 amperes, 120 amperes, 280 amperes, 120 amperes and finally at 280 amperes.

From the foregoing it will be appreciated that the method enables the electrochemical machining process to be advantageously used in deburring workpieces that would otherwise have to be deburred in some other less efficient way. Also, the control system 18 senses and regulates the supply current from the power supply and not the gap current. Gap current and gap voltage are unpredictable control mediums because the gap impedance varies considerably due to temperature, saturation of the electrolyte, gap spacing and other factors. Moreover, it is the supply current that actually determines the current density and accordingly the machining rate.

The invention is to be limited only by the following claims.

What is claimed is:

1. The method of electrochemically removing stock from a conductive workpiece with a conductive cutting tool spaced therefrom so as to provide an electrolyte-filled machining gap therebetween, the steps of positioning the cutting tool into short circuit relationship with protruding obstacles on the workpiece, sequentially providing timed direct current at a level to cause heating of the protruding obstacles, providing timed direct current at a level to allow cooling of the workpiece, and providing direct current at a level to electrochemically machine the workpiece to the desired size.

2. The method of electrochemically removing stock from a conductive workpiece with a conductive cutting tool spaced therefrom so as to provide an electrolyte-filled machining gap therebetween comprising the steps of positioning the cutting tool into short circuit relationship with protruding objects on the workpiece, supplying current to and between the cutting tool and workpiece, sensing the amount of current supplied to and between the cutting tool and workpiece, comparing the current sensed with a timed reference current, developing a corresponding error signal, altering the supply current to and between the cutting tool and workpiece to correct for the error signal, sequentially establishing a reference current to provide for timed direct current to the cutting tool and workpiece at a level to heat the protruding obstacles, establishing a reference current to the cutting tool and workpiece at a level to burn away the protruding obstacles, establishing a reference current to provide for timed direct current to the cutting tool and workpiece at a level to allow cooling of the workpiece, and establishing a reference current to provide for direct current to the cutting tool and workpiece at a level to electrochemically machine the workpiece.

References Cited

UNITED STATES PATENTS

| | | | |
|---|---|---|---|
| 2,974,215 | 3/1961 | Inque | 219—68 |
| 3,213,258 | 10/1965 | Ferguson | 219—69 |
| 3,267,018 | 8/1966 | Greening | 204—224 |
| 2,479,302 | 8/1949 | Bondley | 204—140.5 |
| 3,058,895 | 10/1962 | Williams | 204—143 |
| 3,095,364 | 6/1963 | Faust et al. | 204—143 |
| 3,121,054 | 2/1964 | VanEmden | 204—228 |

(Other references on following page)

UNITED STATES PATENTS

| | | | |
|---|---|---|---|
| 3,223,603 | 12/1965 | Inoue | 204—143 |
| 3,239,441 | 3/1966 | Marosi | 204—143 |
| 3,247,087 | 4/1966 | Gauthier | 204—143 |
| 3,275,538 | 9/1966 | Haupt et al. | 204—143 |

FOREIGN PATENTS

| | | |
|---|---|---|
| 637,872 | 5/1950 | Great Britain. |
| 1,290,734 | 3/1962 | France. |

OTHER REFERENCES

Metal Working News, 5—1963, Monday—27th, page 12.

ROBERT K. MIHALEK, Primary Examiner

U.S. Cl. X.R.

204—228, 274

PO-1050
(5/69)

UNITED STATES PATENT OFFICE
CERTIFICATE OF CORRECTION

Patent No. 3,468,775          Dated September 23, 1969

Inventor(s) Harold W. Lanning and Alfred J. Williams, Jr.

It is certified that error appears in the above-identified patent and that said Letters Patent are hereby corrected as shown below:

Column 1, line 44, after "method is" insert -- proposed --.

Column 4, line 38, after "to" and before "allow" insert -- cause burning away of the protruding obstacles, providing timed direct current at a level to -- line 56, after "current" insert -- to provide for timed direct current --; line 68, "Inque" should be -- Inoue --.

SIGNED AND
SEALED
JUN 2 1970

(SEAL)
Attest:

Edward M. Fletcher, Jr.
Attesting Officer

WILLIAM E. SCHUYLER, JR.
Commissioner of Patents